United States Patent
Vitt et al.

(10) Patent No.: US 12,442,304 B1
(45) Date of Patent: Oct. 14, 2025

(54) GAS TURBINE ENGINE WITH BOW WAVE MITIGATION

(71) Applicant: General Electric Company, Evendale, OH (US)

(72) Inventors: Paul Hadley Vitt, Liberty Township, OH (US); Prem Venugopal, Clifton Park, NY (US); Thomas William Vandeputte, Scotia, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/077,182

(22) Filed: Mar. 12, 2025

(51) Int. Cl.
*F01D 5/14* (2006.01)
*F01D 9/04* (2006.01)

(52) U.S. Cl.
CPC ............. *F01D 5/143* (2013.01); *F01D 9/041* (2013.01); *F05D 2220/3213* (2013.01); *F05D 2220/3217* (2013.01); *F05D 2240/121* (2013.01)

(58) Field of Classification Search
CPC ..... F01D 5/143; F01D 9/041; F05D 2240/121
See application file for complete search history.

(56) References Cited

U.S. PATENT DOCUMENTS

| | | | |
|---|---|---|---|
| 5,211,536 A | 5/1993 | Ackerman et al. | |
| 5,224,818 A | 7/1993 | Drerup et al. | |
| 5,466,123 A | 11/1995 | Rose | |
| 6,769,865 B2 | 8/2004 | Kress et al. | |
| 7,121,793 B2 | 10/2006 | Correia | |
| 7,134,842 B2 | 11/2006 | Tam et al. | |
| 7,220,100 B2 | 5/2007 | Lee et al. | |
| 7,625,181 B2 | 12/2009 | Matsuda et al. | |
| 7,887,297 B2 | 2/2011 | Allen-Bradley et al. | |
| 8,105,037 B2 | 1/2012 | Grover et al. | |
| 8,177,499 B2 | 5/2012 | Iida | |
| 8,192,153 B2 | 6/2012 | Harvey et al. | |
| 8,328,511 B2 | 12/2012 | Hernandez Russe et al. | |
| 8,356,975 B2* | 1/2013 | Grover | F01D 5/143 415/191 |
| 8,439,643 B2 | 5/2013 | Kuhne et al. | |
| 8,834,129 B2 | 9/2014 | Barnes et al. | |
| 8,926,267 B2 | 1/2015 | Lee et al. | |
| 9,103,213 B2 | 8/2015 | Barr et al. | |

(Continued)

OTHER PUBLICATIONS

Co-Pending U.S. Appl. No. 18/609,120, filed Mar. 19, 2024.

*Primary Examiner* — Eldon T Brockman
(74) *Attorney, Agent, or Firm* — Dority & Manning, P.A.

(57) ABSTRACT

A gas turbine engine includes a turbomachine having a compressor section, a combustion section, and a turbine section. The turbine section includes a band having an upstream end and a downstream end. The band extends between the upstream end and the downstream end, and the band at least partially defines the working gas flow path. A plurality of airfoils extend into the working gas flow path from the band. Each airfoil of the plurality of airfoils includes a leading edge, a trailing edge, a first side, and a second side opposite the first side. Each of the plurality of airfoils is substantially symmetric across an airfoil centerline extending through a center of each of the plurality of airfoils. The band defines a valley portion adjacent the leading edge of each of the plurality of airfoils and a pair of hill portions on opposing sides of the valley portion.

20 Claims, 5 Drawing Sheets

(56) References Cited

U.S. PATENT DOCUMENTS

| | | | |
|---|---|---|---|
| 9,334,756 B2 | 5/2016 | Ring et al. | |
| 9,638,041 B2 | 5/2017 | Brozyna et al. | |
| 9,874,101 B2 | 1/2018 | Xu | |
| 10,577,955 B2 | 3/2020 | Shirley et al. | |
| 10,590,781 B2 * | 3/2020 | Correia | F01D 5/143 |
| 10,830,073 B2 | 11/2020 | Aggarwala | |
| 10,890,072 B2 | 1/2021 | Balzer | |
| 11,041,391 B2 | 6/2021 | Porter et al. | |
| 11,149,575 B2 | 10/2021 | Kerns et al. | |
| 11,231,175 B2 | 1/2022 | Berry et al. | |
| 11,939,880 B1 * | 3/2024 | Vitt | F01D 5/143 |
| 2007/0134088 A1 | 6/2007 | Lee et al. | |
| 2007/0258810 A1 | 11/2007 | Aotsuka et al. | |
| 2010/0158696 A1 | 6/2010 | Pandey et al. | |
| 2010/0278644 A1 | 11/2010 | Gersbach et al. | |
| 2011/0123322 A1 | 5/2011 | Allen-Bradley et al. | |
| 2013/0004315 A1 | 1/2013 | Beeck et al. | |
| 2013/0156562 A1 | 6/2013 | Mahle et al. | |
| 2013/0224027 A1 * | 8/2013 | Barr | F01D 5/143 416/193 A |
| 2014/0090380 A1 * | 4/2014 | Aggarwala | F04D 29/681 416/189 |
| 2014/0154068 A1 * | 6/2014 | Aggarwala | F04D 29/681 416/243 |
| 2014/0212260 A1 * | 7/2014 | Xu | F01D 9/041 415/1 |
| 2016/0017796 A1 | 1/2016 | Xu et al. | |
| 2018/0328184 A1 * | 11/2018 | Brettschneider | F01D 9/041 |
| 2018/0347381 A1 * | 12/2018 | Molony | F01D 11/006 |
| 2019/0003323 A1 * | 1/2019 | Shirley | F01D 5/143 |
| 2019/0085718 A1 | 3/2019 | Jang | |
| 2020/0248572 A1 | 8/2020 | Adhate et al. | |

* cited by examiner

GAS TURBINE ENGINE WITH BOW WAVE MITIGATION

FIELD

The present disclosure relates to gas turbine engines and, more particularly, to reducing bow wave effects at components of gas turbine engines.

BACKGROUND

Turbine engines generally include a fan and a core section arranged in flow communication with one another. A combustor is arranged in the core section to generate combustion gases for driving a turbine in the core section of the turbine engine.

When the combustion gases approach an interface between two components of the turbine, such as the high pressure turbine and a turbine center frame and/or the low pressure turbine and a turbine rear frame, a pressure or bow wave may reflect a portion of the combustion gases upstream, creating pressure variations and non-uniform pressure distribution at the interface between the components. The pressure variations may cause ingestion of the hot combustion gases, which may undesirably heat components of the turbine engine, resulting in decreased engine durability and decreased engine performance. Accordingly, systems and apparatuses for reducing bow wave effects within gas turbine engines are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
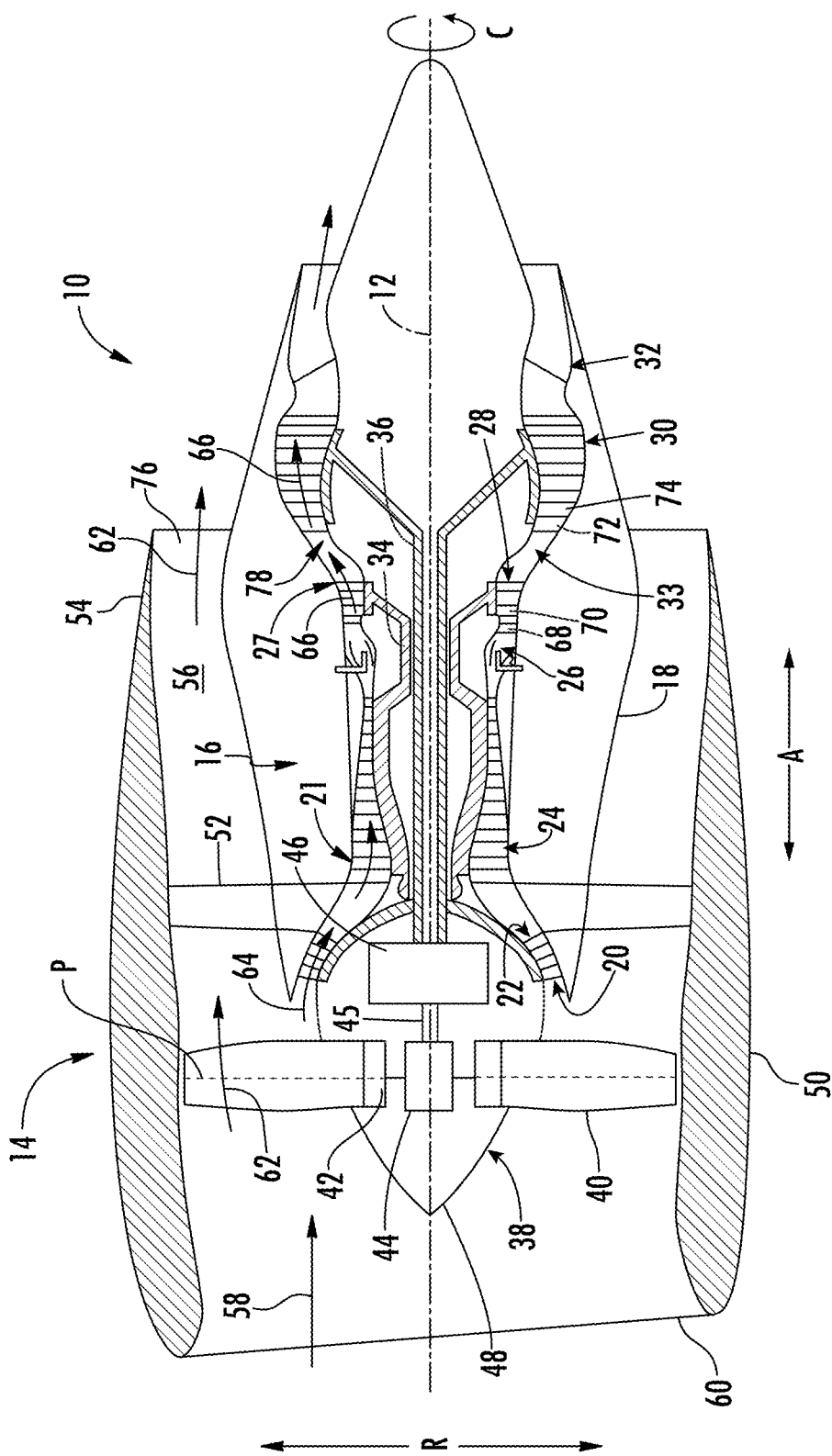
FIG. 1 is a schematic cross-sectional view of a gas turbine engine according to an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, or C" refers to only A, only B, only C, or any combination of A, B, and C.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The term "bypass passage" refers generally to a passage with an airflow from a fan of the gas turbine engine that flows over an upstream-most inlet to a turbomachine of the gas turbine engine. In a ducted gas turbine engine, the bypass passage is the passage defined between an outer nacelle (surrounding the fan of the gas turbine engine) and one or more cowls inward of the outer nacelle (e.g., a fan cowl, a core cowl or both if both are present). In an unducted gas turbine engine, the bypass passage refers to an open sided passage (i.e., not explicitly defined by structure such as an outer nacelle) where airflow from the fan passes over an upstream-most inlet to the turbomachine (e.g., an inlet to inlet duct of the engine), defined at least in part by a primary fan outer fan area, which refers to an area defined by an annulus representing a portion of the fan located outward of an inlet splitter at the upstream-most inlet to the turbomachine. An airflow through the bypass passage of a ducted or an unducted engine refers to all of the airflow from the fan that is not provided through the upstream-most inlet to the turbomachine.

The term "bypass ratio" refers to a ratio in an engine of an amount of airflow that is bypassed around the engine's ducted inlet (through the bypass passage) to the amount that passes through the engine's ducted inlet. For example, in the embodiment of FIG. 1, discussed below, the bypass ratio refers to an amount of airflow from the fan 38 that flows over the outer casing 18 and into the bypass airflow passage 56 to an amount of airflow from the fan 38 that flows through the annular core inlet 20.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the term "adjacent" refers to being closer to one end or component than an opposite end or another component. For example, when used in conjunction with first and second ends; high pressure and low pressure sides; or the like, the phrase "proximate the first end," or "proximate the high pressure side," refers to a location closer to the first end than the second end, or closer to the high pressure side than the low pressure side, respectively.

As used herein a "concave" curve is a curve that bends or extends inward from a flat surface.

As used herein a "convex" curve is a curve that protrudes outward from a flat surface.

Generally, a gas turbine engine includes a fan and a turbomachine, with the turbomachine rotating the fan to generate thrust. The turbomachine includes a compressor section, a combustion section, a turbine section, and an exhaust section and defines a working gas flow path therethrough. Bow waves may be generated as combustion gases approach an interface between the combustion section and the turbine section. The bow waves may cause hot combustion gases to be ingested into components of the gas turbine engine, resulting in loss of product life and requiring additional cooling of components.

The present disclosure is generally related to reducing bow wave effects at an interface between components within gas turbine engines. For example, the present disclosure utilizes a plurality of bumps or hills to raise a static pressure upstream of a plurality of airfoils and a plurality of troughs or valleys to lower the static pressure upstream of the plurality of airfoils. Accordingly, a circumferential pressure gradient is reduced, which reduces ingestion of hot combustion gases into components of the gas turbine engine. Moreover, each of the plurality of airfoils are substantially symmetric across an airfoil centerline.

Referring now to the drawings, FIG. 1 is a schematic cross-sectional view of a gas turbine engine 10 according to an exemplary embodiment of the present disclosure.

As shown in FIG. 1, the gas turbine engine 10 has an axial direction A (extending parallel to a longitudinal centerline axis 12) and a radial direction R that is normal to the axial direction A. In general, the gas turbine engine 10 includes a fan section 14 and a turbomachine 16 disposed downstream from the fan section 14.

The turbomachine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor ("LPC") 22 followed downstream by a high-pressure compressor ("HPC") 24, a combustion section 26, a turbine section 27, including a high-pressure turbine ("HPT") 28, followed downstream by a low-pressure turbine ("LPT") 30, and one or more core exhaust nozzles 32. A high-pressure ("HP") shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure ("LP") shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustion section 26, the turbine section 27, and the one or more core exhaust nozzles 32 together define a working gas flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, a downstream section 54 of the nacelle 50 extends over an outer portion of the turbomachine 16 to define a bypass airflow passage 56 therebetween. The one or more core exhaust nozzles 32 may extend through the nacelle 50 and be formed therein. In this exemplary embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the gas turbine engine 10, a volume of air 58 enters the gas turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the working gas flow path 33, or, more specifically, into the annular core inlet 20. The ratio between the first portion of air (bypass air 62) and the second portion of air (core air 64) is known as a bypass ratio. In some embodiments, the bypass ratio is greater than 18:1. The pressure of the core air 64 is then increased by the LPC 22, generating compressed air, and the compressed air is routed through the HPC 24 and further compressed before being directed into the combustion section 26, where the compressed air is mixed with fuel and burned to generate combustion gases 66 (combustion products). One or more stages may be used in each of the LPC 22 and the HPC 24, with each subsequent stage further compressing the compressed air. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio may be greater than 20:1.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 enables the HPT 28 to have a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the turbomachine 16 to provide propulsive thrust. Simultaneously with the flow of the core air 64 through the working gas flow path 33, the bypass air 62 is routed through the bypass airflow passage 56 before being exhausted from a fan bypass nozzle 76 of the gas turbine engine 10, also providing propulsive thrust. The HPT 28, the LPT 30, and the one or more core exhaust nozzles 32 at least partially define a hot gas path 78 for routing the combustion gases 66 through the turbomachine 16.

As noted above, the compressed air (the core air 64) is mixed with the fuel in the combustion section 26 to generate a fuel and air mixture, and combusted, generating combustion gases 66 (combustion products). The fuel can include any type of fuel used for turbine engines, such as, for example, sustainable aviation fuels (SAF) including biofuels, JetA, or other hydrocarbon fuels. The fuel also may be a hydrogen-based fuel ($H_2$), and, while hydrogen-based fuel may include blends with hydrocarbon fuels, the fuel used herein is preferably unblended, and referred to herein as hydrogen fuel. In some embodiments, the hydrogen fuel may comprise substantially pure hydrogen molecules (i.e., diatomic hydrogen). The fuel may also be a cryogenic fuel. For example, when the hydrogen fuel is used, the hydrogen fuel may be stored in a liquid phase at cryogenic temperatures.

The gas turbine engine 10 depicted in FIG. 1 is by way of example only. In other exemplary embodiments, the gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turboprop engines, ground power generation machines, or a combination thereof.

Figure 2A:
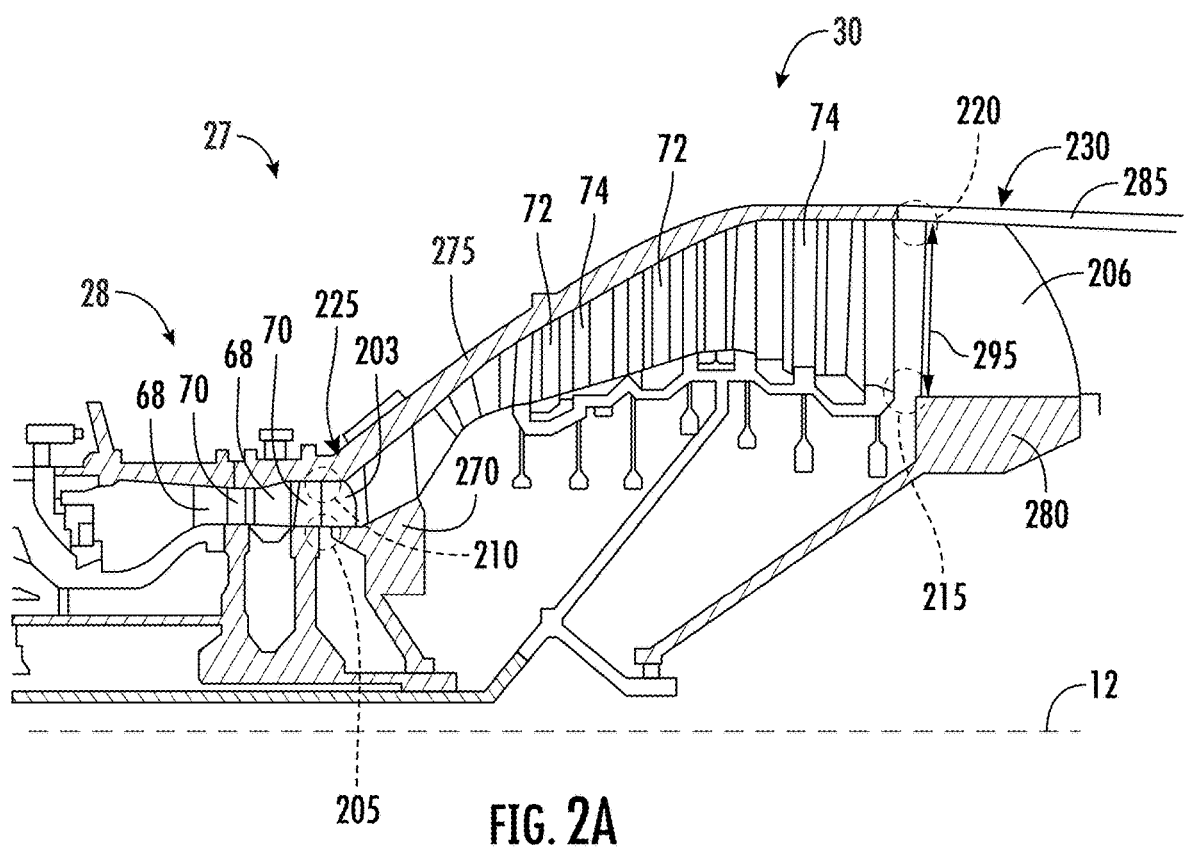
FIG. 2A is a cross-sectional view of a turbine section of the gas turbine engine of FIG. 1 according to an exemplary embodiment of the present disclosure.
Figure 2B:
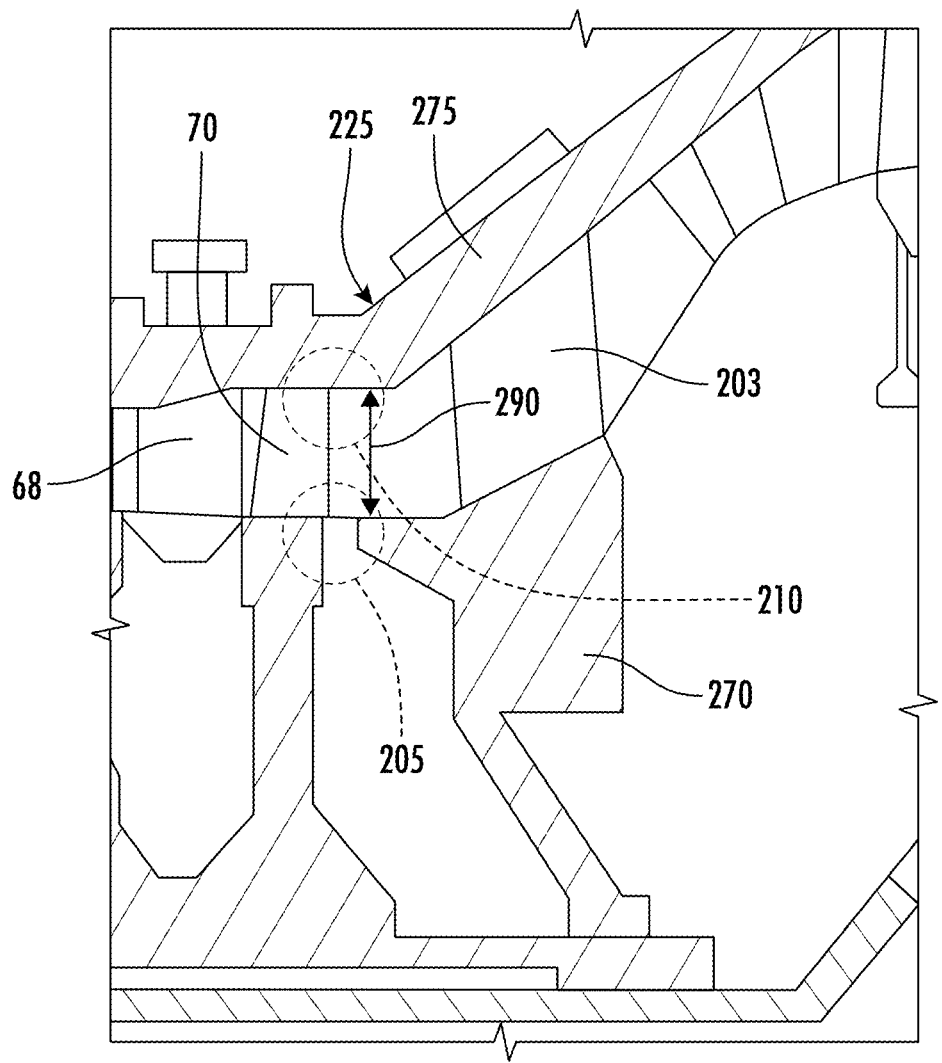
FIG. 2B is a detailed view of a turbine center frame of the turbine section of FIG. 2A according to an exemplary embodiment of the present disclosure.

FIG. 2A is a cross-sectional view of the turbine section 27 of the gas turbine engine 10 of FIG. 1 according to an exemplary embodiment of the present disclosure. FIG. 2B is a detailed view of a turbine center frame 225 of the turbine section 27 of FIG. 2A according to an exemplary embodiment of the present disclosure.

The turbine section 27 includes a plurality of center frame airfoils 203 disposed aft of the HPT 28 and a plurality of rear frame airfoils 206 disposed aft of the LPT 30. The plurality of center frame airfoils 203 and the plurality of rear frame airfoils 206 are disposed circumferentially about the longitudinal centerline axis 12. The plurality of center frame airfoils 203 are disposed between a turbine center frame inner band 270 and a turbine center frame outer band 275 of the turbine center frame 225. With reference to FIG. 2B, the plurality of center frame airfoils 203 define a center frame airfoil height 290 extending between the turbine center frame inner band 270 and the turbine center frame outer band 275 measured at a leading edge of each of the plurality of center frame airfoils 203.

With reference back to FIG. 2A, the plurality of rear frame airfoils 206 are disposed between a turbine rear frame inner band 280 and a turbine rear frame outer band 285 of a turbine rear frame 230. As shown in FIG. 2A, the plurality of rear frame airfoils 206 define a rear frame airfoil height 295 extending between the turbine rear frame outer band 285 of the turbine rear frame 230 measured at a leading edge of each of the plurality of rear frame airfoils 206.

In at least one example embodiment, a surface of the turbine center frame 225 upstream of the plurality of center frame airfoils 203 includes a contoured surface for reducing bow wave effects. For example, the contoured surface may be disposed at a first interface 205 aft of the HPT 28 on the turbine center frame inner band 270 of the turbine center frame 225. Additionally, or alternatively, the contoured surface may be disposed at a second interface 210 aft of the HPT 28 on the turbine center frame outer band 275 of the turbine center frame 225. The contoured surface at one or both of the first interface 205 and the second interface 210 is at least partially upstream of the plurality of center frame airfoils 203, as will be discussed with respect to FIG. 3.

In other example embodiments, the contoured surface may be disposed at a third interface 215 aft of the LPT 30 on the turbine rear frame inner band 280 of the turbine rear frame 230. Additionally, or alternatively, the contoured surface may be disposed at a fourth interface 220 aft of the LPT 30 on the turbine rear frame outer band 285 of the turbine rear frame 230. Moreover, the contoured surface at one or both of the third interface 215 and the fourth interface 220 is at least partially upstream of the plurality of rear frame airfoils 206, as will be discussed with respect to FIG. 3.

Figure 3:
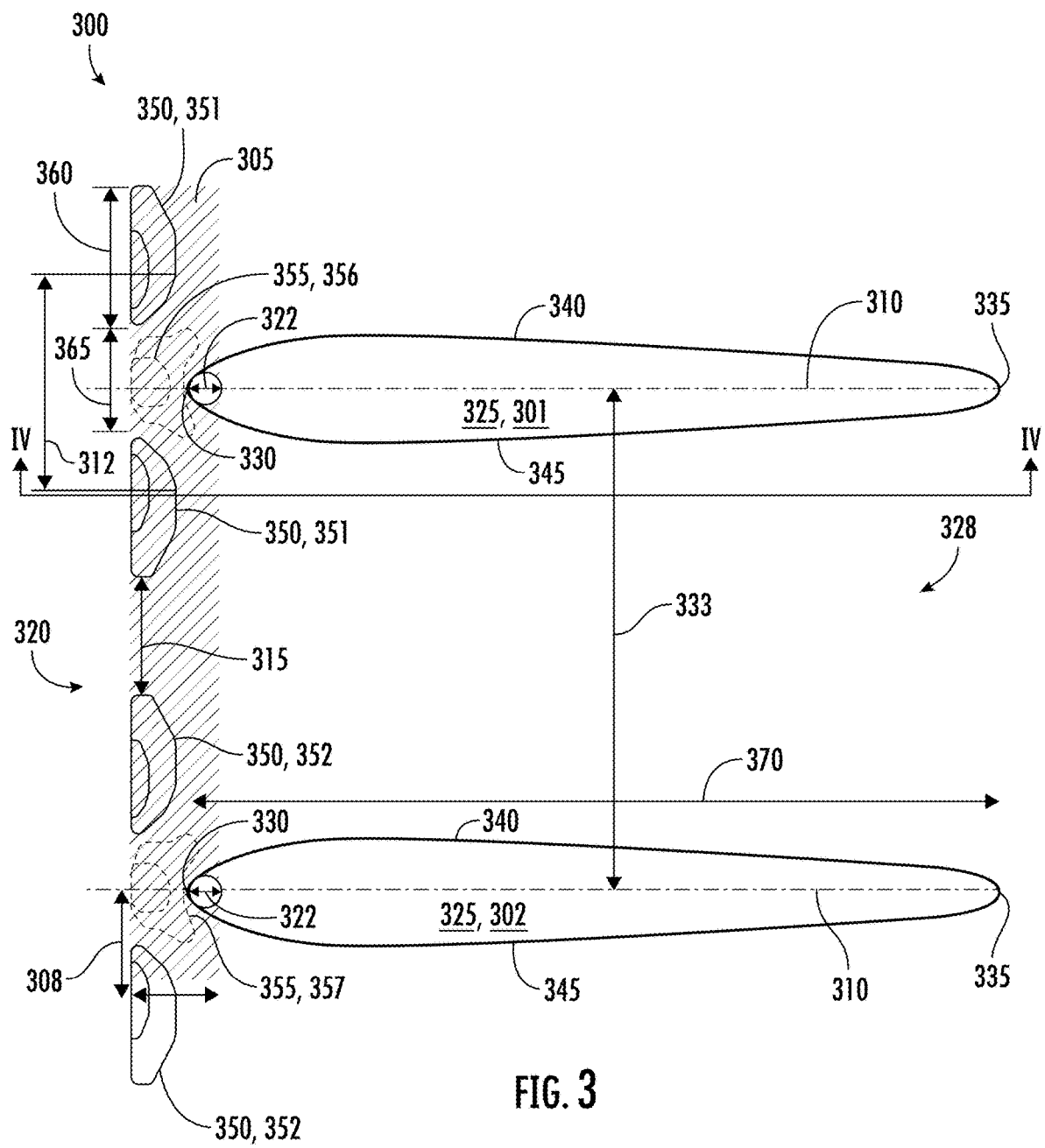
FIG. 3 is a radially inward view of an interface of the turbine section of FIG. 2A according to an exemplary embodiment of the present disclosure.
Figure 4:
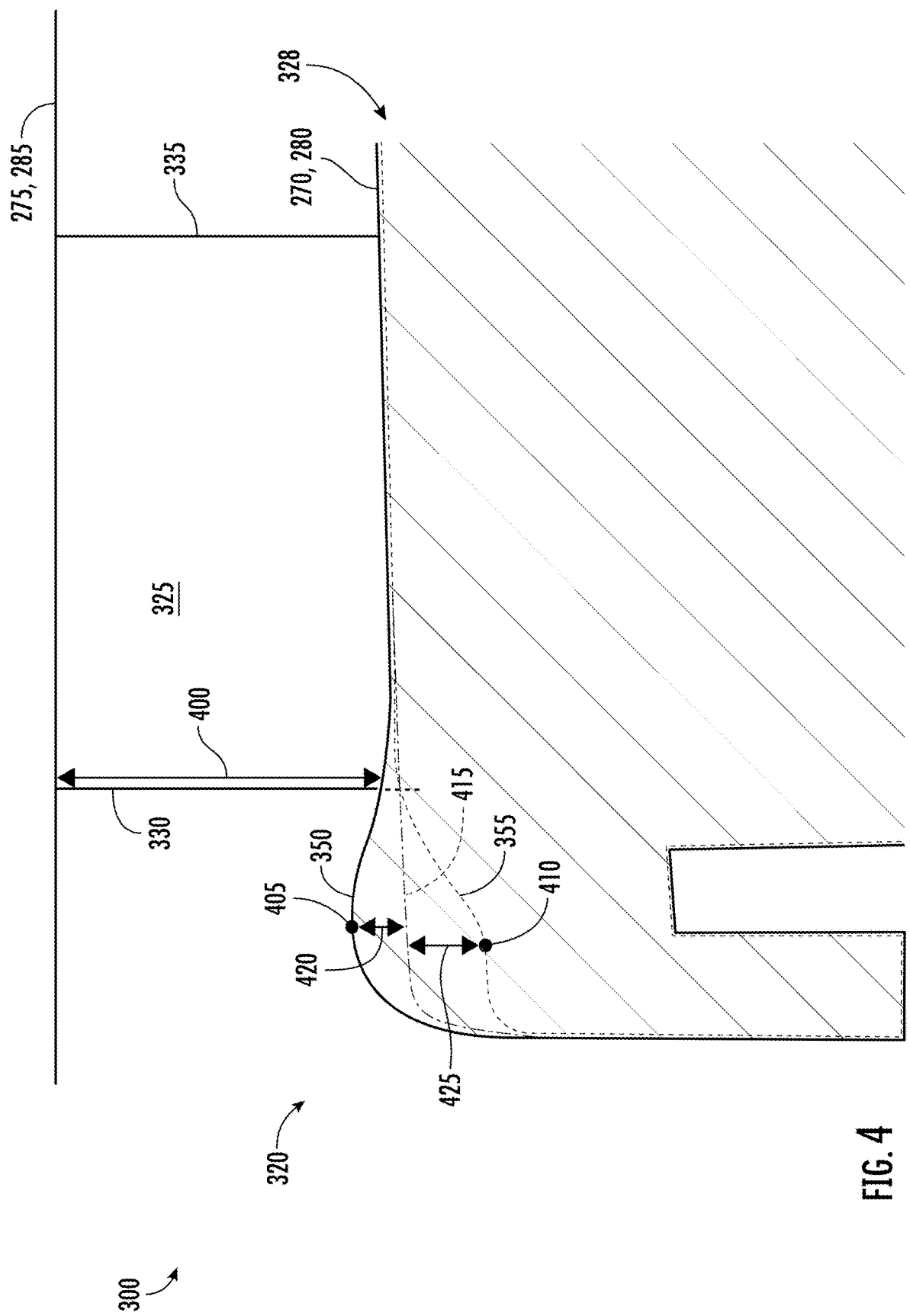
FIG. 4 is a cross-sectional view through line IV-IV of the interface of the turbine section of FIG. 3 according to an exemplary embodiment of the present disclosure.

FIG. 3 is a radially inward view of an interface 300 of the turbine section 27 according to an exemplary embodiment of the present disclosure. FIG. 4 is a cross-sectional view through line IV-IV of the interface 300 of the turbine section 27 of FIG. 3 according to an exemplary embodiment of the present disclosure. More particularly, the interface 300 may be the first interface 205, the second interface 210, the third interface 215, the fourth interface 220, or a combination thereof. FIGS. 3-4 also illustrate at least one of a plurality of airfoils 325. The plurality of airfoils 325 include the plurality of center frame airfoils 203 and the plurality of rear frame airfoils 206 discussed with respect to FIGS. 2A-2B.

The plurality of airfoils 325 include a leading edge 330, a trailing edge 335, a first side 340 extending between the leading edge 330 and the trailing edge 335, and a second side 345 opposite the first side 340 and extending between the leading edge 330 and the trailing edge 335. Moreover, the plurality of airfoils 325 are substantially symmetric across an airfoil centerline 310 extending through a center of the plurality of airfoils 325 from the leading edge 330 to the trailing edge 335.

A contoured surface 305, as indicated by the shaded region in FIG. 3, is defined at least partially upstream of the leading edge 330 of the plurality of airfoils 325. As discussed with respect to FIGS. 2A-2B, a surface of the turbine center frame inner band 270, the turbine center frame outer band 275, the turbine rear frame inner band 280, the turbine rear frame outer band 285, or a combination thereof defines the contoured surface 305. The contoured surface 305 includes a pair of hill portions 350 and a valley portion 355 adjacent to and upstream of each of the plurality of airfoils 325. The valley portion 355 is adjacent the leading edge 330 of each of the plurality of airfoils 325 and the pair of hill portions 350 are on opposing sides of the valley portion 355. For example, a first one of the pair of hill portions 350 is adjacent the first side 340 of each of the plurality of airfoils 325 and a second one of the pair of hill portions 350 is adjacent the second side 345 of the plurality of airfoils 325. The pair of hill portions 350 may also be symmetrical across the airfoil centerline 310.

Additionally, the pair of hill portions 350 adjacent one of the plurality of airfoils 325 may be spaced apart from the pair of hill portions 350 adjacent another one of the plurality of airfoils 325. For example, the plurality of airfoils 325 may include a first airfoil 301 and a second airfoil 302 adjacent the first airfoil 301. The pair of hill portions 350 may include a first set 351 of the pair of hill portions 350 and the valley portion 355 may include a first valley portion 356 where the first set 351 and the first valley portion 356 are adjacent the first airfoil 301. The pair of hill portions 350 may also include a second set 352 of the pair of hill portions 350 and the valley portion 355 may include a second valley portion 357 where the second set 352 and the second valley portion 357 are adjacent the second airfoil 302. As shown in FIG. 3, the first set 351 and the second set 352 of the pair of hill portions 350 may be spaced a first hill spacing distance 315.

The pair of hill portions 350 and the valley portion 355 extend from an upstream end 320 towards a downstream end 328. More particularly, the pair of hill portions 350 and the valley portion 355 extend from the upstream end 320 towards the leading edge 330 of the plurality of airfoils 325. Moreover, one or both of the pair of hill portions 350 and the valley portion 355 may extend at least partially past the leading edge 330 of the plurality of airfoils 325. For example, as shown in FIG. 3, the valley portion 355 at least partially extend past and wrap around the leading edge 330 of the plurality of airfoils.

The leading edge 330 of each of the plurality of airfoils 325 defines a leading edge diameter 322. One or both of the pair of hill portions 350 and the valley portion 355 may be disposed upstream of an aft end of the leading edge diameter 322. For example, the pair of hill portions 350 and the valley portion 355 do not extend past the leading edge diameter 322 at the leading edge 330 of the plurality of airfoils 325.

With reference still to FIG. 3, each hill of the pair of hill portions 350 defines a hill width 360 and the valley portion 355 defines a valley width 365. The hill width 360 and the valley width 365 extend perpendicular to the airfoil centerline 310. A center of each hill of the pair of hill portions 350 may be spaced a spacing distance 308 from a center of the valley portion 355. The center of each hill of the pair of hill portions 350 may also be spaced a second hill spacing distance 312.

Additionally, each of the plurality of airfoils 325 may be spaced an airfoil distance 333. For example, as shown in FIG. 3, the airfoil distance 333 is defined between the airfoil centerline 310 of the first airfoil 301 and the airfoil centerline 310 of the second airfoil 302. The airfoil distance 333 represents a pitch of the plurality of airfoils 325. In at least one example embodiment, the spacing distance 308 is greater than or equal to 0.01 and less than or equal to 0.4 times the airfoil distance 333. In additional example embodiments, the second hill spacing distance 312 is less than or equal to about 50% of the airfoil distance 333. Moreover, the first hill spacing distance 315 may be greater than or equal to 0 and less than or equal to 0.8 times the airfoil distance 333.

A normalized hill width $HW_n$ of each hill of the pair of hill portions 350 is defined by the hill width 360, or hill width HW, divided by the airfoil distance 333, or airfoil pitch P. The ratio can be defined as, the normalized hill width $HW_n$ equals HW/P. The normalized hill width $HW_n$ is greater than or equal to 0.1 and less than or equal to 0.4. More particularly, the normalized hill width $HW_n$ may be greater than or equal to 0.2 and less than or equal to 0.35.

Moreover, a normalized valley width $VW_n$ of the valley portion 355 is defined by the valley width 365, or valley width VW, divided by the airfoil distance 333, or the airfoil pitch P. The ratio can be defined as, the normalized valley width $VW_n$ equals VW/P. In at least one example embodiment, the normalized valley width $VW_n$ is greater than or equal to 0 and less than or equal to 0.2.

As shown in FIG. 3, the plurality of airfoils 325 include an airfoil width 370, also referred to as an airfoil width AW, extending between the leading edge 330 and the trailing edge 335. With reference to FIG. 4, the plurality of airfoils 325 also include an airfoil height 400 extending between the inner and outer band portions and measured at the leading edge 330. More particularly, the airfoil height 400 is the center frame airfoil height 290 extending between the turbine center frame inner band 270 and the turbine center frame outer band 275 measured at a leading edge of each of the plurality of center frame airfoils 203 and the rear frame airfoil height 295 extending between the turbine rear frame outer band 285 of the turbine rear frame 230 measured at a leading edge of each of the plurality of rear frame airfoils 206.

With reference now to FIG. 4, each hill of the pair of hill portions 350 defines a generally convex curve having a hill peak 405. The hill peak 405 is at a maximum height of each hill of the pair of hill portions 350. The hill peak 405 may also be an inflection point along the curvature of each hill of the pair of hill portions 350. Moreover, the valley portion 355 (represented by a dashed line in FIG. 4) defines a generally concave curve having a valley base 410. The valley base 410 is a maximum depth of the valley portion 355. Both the hill peak 405 and the valley base 410 may be positioned upstream of the leading edge 330 of the plurality of airfoils 325.

A mean contour line 415 may be defined between each hill of the pair of hill portions 350 and the valley portion 355. The mean contour line 415 may be a lateral average of the curvature of each hill of the pair of hill portions 350 and the valley portion 355 extending from the upstream end 320 towards the downstream end 328. A hill height 420 may be defined between the mean contour line 415 and the hill peak 405, and a valley depth 425 may be defined between the mean contour line 415 and the valley base 410. In at least one example embodiment, the hill height 420 divided by the airfoil height 400 measured at the leading edge 330 is greater than 0.005 to and less than 0.1. Additionally, the valley depth 425 divided by the airfoil height 400 measured at the leading edge 330 is greater than or equal to 0 and less than or equal to 0.1.

The valley depth 425 (also referred to as a valley depth D) may be normalized relative to the airfoil height 400 (also referred to as an airfoil height $H_{airfoil}$) to define a normalized valley depth $VD_n$. The airfoil height 400 may vary between the leading edge 330 and the trailing edge 335. Accordingly, the airfoil height $H_{airfoil}$ is measured at the leading edge 330, as discussed with respect to the airfoil height 400 of FIG. 4. The normalized valley depth $VD_n$ is determined by dividing the valley depth D by the airfoil height $H_{airfoil}$. The ratio can be defined as, $$VD_n = \frac{D}{H_{airfoil}}.$$

The normalized valley depth $VD_n$ is greater than or equal to 0 and less than or equal to 0.1.

The hill height 420 (also referred to as a hill height $H_{hill}$) may be normalized relative to the airfoil height $H_{airfoil}$ to define a normalized hill height $HH_n$. The normalized hill height $HH_n$ is determined by dividing the hill height $H_{hill}$ by the airfoil height $H_{airfoil}$. The ratio can be defined as, $$HH_n = \frac{H_{hill}}{H_{airfoil}}.$$

The normalized hill height $HH_n$ is greater than 0.005 and less than 0.1.

Accordingly, providing a contoured surface upstream of a plurality of airfoils reduces bow wave effects within a gas turbine engine. For example, a plurality of hills and a plurality of valleys upstream a plurality of airfoils reduces a circumferential pressure gradient such that ingestion of hot combustion gases into components of the gas turbine engine is reduced. Without such reduction in bow wave effects, hot combustion gases undesirably increases the temperature of the turbine engine components. Therefore, the plurality of hills and the plurality of valleys reduce the need for additional cooling requirements and improve durability of components of the gas turbine engine.

Further aspects are provided by the subject matter of the following clauses:

A gas turbine engine, comprising: a turbomachine comprising a compressor section, a combustion section, and a turbine section collectively defining at least in part a working gas flow path, the turbine section comprising: a band comprising an upstream end and a downstream end, the band extending between the upstream end and the downstream end, the band at least partially defining the working gas flow path, and a plurality of airfoils extending into the working gas flow path from the band, wherein each airfoil of the plurality of airfoils includes a leading edge, a trailing edge, a first side extending between the leading edge and the trailing edge, and a second side opposite the first side and extending between the leading edge and the trailing edge, and wherein each of the plurality of airfoils is symmetric across an airfoil centerline extending through a center of each of the plurality of airfoils; wherein the upstream end of the band defines a valley portion adjacent the leading edge of each of the plurality of airfoils and a pair of hill portions on opposing sides of the valley portion.

The gas turbine engine of any preceding clause, wherein: the plurality of airfoils define an airfoil pitch (P) extending between the airfoil centerline of adjacent ones of the plurality of airfoils; each hill of the pair of hill portions defines a normalized hill width ($HW_n$) defined by a hill width (HW) of each hill of the pair of hill portions and the airfoil pitch (P) of the plurality of airfoils; the normalized hill width ($HW_n$) is equal to HW/P; and the normalized hill width ($HW_n$) is greater than or equal to 0.1 and less than or equal to 0.4.

The gas turbine engine of any preceding clause, wherein the normalized hill width ($HW_n$) is greater than or equal to 0.2 and less than or equal to 0.35.

The gas turbine engine of any preceding clause, wherein: each hill of the pair of hill portions defines a normalized hill height ($HH_n$) defined by a hill height ($H_{hill}$) of each hill of the pair of hill portions and an airfoil height ($H_{airfoil}$) of the plurality of airfoils measured at the leading edge; the normalized hill height ($HH_n$) is equal to $$\frac{H_{hill}}{H_{airfoil}};$$

and the normalized hill height ($HH_n$) is greater than 0.005 and less than 0.1.

The gas turbine engine of any preceding clause, wherein: the valley portion defines a normalized valley depth ($VD_n$) defined by a valley depth (D) of the valley portion and an airfoil height ($H_{airfoil}$) of the plurality of airfoils at the leading edge; the normalized valley depth ($VD_n$) is equal to $$\frac{D}{H_{airfoil}};$$

and the normalized valley depth ($VD_n$) is greater than or equal to 0 and less than or equal to 0.1.

The gas turbine engine of any preceding clause, wherein: the plurality of airfoils define an airfoil pitch (P) extending between the airfoil centerline of adjacent ones of the plurality of airfoils; the valley portion defines a normalized valley width ($VW_n$) defined by a valley width (VW) of the valley portion and the airfoil pitch (P) of the plurality of airfoils; the normalized valley width ($VW_n$) is equal to VW/P; and the normalized valley width ($VW_n$) is greater than or equal to 0 and less than or equal to 0.2.

The gas turbine engine of any preceding clause, wherein: the leading edge of the plurality of airfoils define a leading edge diameter; and the valley portion and the pair of hill portions are disposed upstream of an aft end of the leading edge diameter.

The gas turbine engine of any preceding clause, wherein the valley portion and the pair of hill portions extend into the upstream end of the band.

The gas turbine engine of any preceding clause, wherein the plurality of airfoils comprise a plurality of stator vanes disposed between a high-pressure turbine and a low-pressure turbine of the turbine section.

The gas turbine engine of any preceding clause, wherein the plurality of airfoils comprise a plurality of stator vanes extending between a turbine center frame inner band and a turbine center frame outer band of a turbine center frame of the turbine section.

The gas turbine engine of any preceding clause, wherein the plurality of airfoils comprise a plurality of stator vanes extending between a turbine rear frame inner band and a turbine rear frame outer band of a turbine rear frame of the turbine section.

The gas turbine engine of any preceding clause, wherein a mean contour line is defined between the valley portion and the pair of hill portions, wherein the valley portion extends below the mean contour line and defines a concave curve, and wherein the pair of hill portions extend above the mean contour line and define a convex curve.

The gas turbine engine of any preceding clause, wherein: the plurality of airfoils includes an airfoil height measured at the leading edge extending from the band; and a hill peak of each of the pair of hill portions extends above the mean contour line to define a hill height, wherein the hill height divided by the airfoil height is greater than 0.005 and less than 0.1.

The gas turbine engine of any preceding clause, wherein: the plurality of airfoils includes an airfoil height measured at the leading edge extending from the band; and a base of the valley portion extends below the mean contour line to define a valley depth, wherein the valley depth divided by the airfoil height is greater than or equal to 0 and less than or equal to 0.1.

The gas turbine engine of any preceding clause, wherein the plurality of airfoils comprise a plurality of stator vanes disposed in a low-pressure turbine of the turbine section.

The gas turbine engine of any preceding clause, wherein a first set of the pair of hill portions adjacent a first one of the plurality of airfoils is spaced from a second set of the pair of hill portions adjacent a second one of the plurality of airfoils, and wherein the second one of the plurality of airfoils is adjacent the first one of the plurality of airfoils.

The gas turbine engine of any preceding clause, wherein: the band comprises an inner band extending between the upstream end and the downstream end and an outer band spaced from the inner band in a radial direction and extending between the upstream end and the downstream end; and the upstream end of one or both of the inner band and the outer band defines the valley portion and the pair of hill portions.

The gas turbine engine of any preceding clause, wherein the upstream end of the band comprises an upstream end of a turbine center frame aft of a high pressure turbine of the turbine section.

The gas turbine engine of any preceding clause, wherein the upstream end of the band comprises an upstream end of a turbine rear frame aft of a low pressure turbine of the turbine section.

The gas turbine engine of any preceding clause, wherein: each hill of the pair of hill portions defines a hill peak at a maximum height of each hill of the pair of hill portions; the valley portion defines a valley base at a maximum depth of the valley portion; and the hill peak and the valley base are upstream of the leading edge of the plurality of airfoils.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine, comprising:
   a turbomachine comprising a compressor section, a combustion section, and a turbine section collectively defining at least in part a working gas flow path, the turbine section comprising:
      a band comprising an upstream end and a downstream end, the band extending between the upstream end and the downstream end, the band at least partially defining the working gas flow path, and
      a plurality of airfoils extending into the working gas flow path from the band, wherein each airfoil of the plurality of airfoils includes a leading edge, a trailing edge, a first side extending between the leading edge and the trailing edge, and a second side opposite the first side and extending between the leading edge and the trailing edge, and wherein each of the plurality of airfoils is symmetric across an airfoil centerline extending through a center of each of the plurality of airfoils;
   wherein the upstream end of the band defines a valley portion adjacent the leading edge of each of the plurality of airfoils and a pair of hill portions on opposing sides of the valley portion.

2. The gas turbine engine of claim 1, wherein:
   the plurality of airfoils define an airfoil pitch (P) extending between the airfoil centerline of adjacent ones of the plurality of airfoils;
   each hill of the pair of hill portions defines a normalized hill width ($HW_n$) defined by a hill width (HW) of each hill of the pair of hill portions and the airfoil pitch (P) of the plurality of airfoils;
   the normalized hill width ($HW_n$) is equal to HW/P; and
   the normalized hill width ($HW_n$) is greater than or equal to 0.1 and less than or equal to 0.4.

3. The gas turbine engine of claim 2, wherein the normalized hill width ($HW_n$) is greater than or equal to 0.2 and less than or equal to 0.35.

4. The gas turbine engine of claim 1, wherein:
   each hill of the pair of hill portions defines a normalized hill height ($HH_n$) defined by a hill height ($H_{hill}$) of each hill of the pair of hill portions and an airfoil height ($H_{airfoil}$) of the plurality of airfoils measured at the leading edge;
   the normalized hill height ($HH_n$) is equal to $$\frac{H_{hill}}{H_{airfoil}};$$

and
   the normalized hill height ($HH_n$) is greater than 0.005 and less than 0.1.

5. The gas turbine engine of claim 1, wherein:
   the valley portion defines a normalized valley depth ($VD_n$) defined by a valley depth (D) of the valley portion and an airfoil height ($H_{airfoil}$) of the plurality of airfoils at the leading edge;

the normalized valley depth ($VD_n$) is equal to $$\frac{D}{H_{airfoil}};$$

and the normalized valley depth ($VD_n$) is greater than or equal to 0 and less than or equal to 0.1.

6. The gas turbine engine of claim 1, wherein:
the plurality of airfoils define an airfoil pitch (P) extending between the airfoil centerline of adjacent ones of the plurality of airfoils;
the valley portion defines a normalized valley width ($VW_n$) defined by a valley width (VW) of the valley portion and the airfoil pitch (P) of the plurality of airfoils;
the normalized valley width ($VW_n$) is equal to VW/P; and
the normalized valley width ($VW_n$) is greater than or equal to 0 and less than or equal to 0.2.

7. The gas turbine engine of claim 1, wherein:
the leading edge of the plurality of airfoils define a leading edge diameter; and
the valley portion and the pair of hill portions are disposed upstream of an aft end of the leading edge diameter.

8. The gas turbine engine of claim 1, wherein the valley portion and the pair of hill portions extend into the upstream end of the band.

9. The gas turbine engine of claim 1, wherein the plurality of airfoils comprise a plurality of stator vanes disposed between a high-pressure turbine and a low-pressure turbine of the turbine section.

10. The gas turbine engine of claim 1, wherein the plurality of airfoils comprise a plurality of stator vanes extending between a turbine center frame inner band and a turbine center frame outer band of a turbine center frame of the turbine section.

11. The gas turbine engine of claim 1, wherein the plurality of airfoils comprise a plurality of stator vanes extending between a turbine rear frame inner band and a turbine rear frame outer band of a turbine rear frame of the turbine section.

12. The gas turbine engine of claim 1, wherein a mean contour line is defined between the valley portion and the pair of hill portions, wherein the valley portion extends below the mean contour line and defines a concave curve, and wherein the pair of hill portions extend above the mean contour line and define a convex curve.

13. The gas turbine engine of claim 12, wherein:
the plurality of airfoils includes an airfoil height measured at the leading edge extending from the band; and
a hill peak of each of the pair of hill portions extends above the mean contour line to define a hill height, wherein the hill height divided by the airfoil height is greater than 0.005 and less than 0.1.

14. The gas turbine engine of claim 12, wherein:
the plurality of airfoils includes an airfoil height measured at the leading edge extending from the band; and
a base of the valley portion extends below the mean contour line to define a valley depth, wherein the valley depth divided by the airfoil height is greater than or equal to 0 and less than or equal to 0.1.

15. The gas turbine engine of claim 1, wherein the plurality of airfoils comprise a plurality of stator vanes disposed in a low-pressure turbine of the turbine section.

16. The gas turbine engine of claim 1, wherein a first set of the pair of hill portions adjacent a first one of the plurality of airfoils is spaced from a second set of the pair of hill portions adjacent a second one of the plurality of airfoils, and wherein the second one of the plurality of airfoils is adjacent the first one of the plurality of airfoils.

17. The gas turbine engine of claim 1, wherein:
the band comprises an inner band extending between the upstream end and the downstream end and an outer band spaced from the inner band in a radial direction and extending between the upstream end and the downstream end; and
the upstream end of one or both of the inner band and the outer band defines the valley portion and the pair of hill portions.

18. The gas turbine engine of claim 1, wherein the upstream end of the band comprises an upstream end of a turbine center frame aft of a high pressure turbine of the turbine section.

19. The gas turbine engine of claim 1, wherein the upstream end of the band comprises an upstream end of a turbine rear frame aft of a low pressure turbine of the turbine section.

20. The gas turbine engine of claim 1, wherein:
each hill of the pair of hill portions defines a hill peak at a maximum height of each hill of the pair of hill portions;
the valley portion defines a valley base at a maximum depth of the valley portion; and
the hill peak and the valley base are upstream of the leading edge of the plurality of airfoils.

* * * * *